(12) United States Patent
Ohshimo

(10) Patent No.: US 6,249,743 B1
(45) Date of Patent: Jun. 19, 2001

(54) METHOD AND APPARATUS OF DETECTING A POSITION OF A MOVABLE BODY

(75) Inventor: Jun Ohshimo, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/452,742

(22) Filed: Dec. 1, 1999

(30) Foreign Application Priority Data

Dec. 1, 1998 (JP) .................................................. 10-342138

(51) Int. Cl.$^7$ .................................................. G01C 21/00
(52) U.S. Cl. .................. 701/207; 701/214; 342/357.01; 342/357.08; 356/375
(58) Field of Search .................................... 701/200, 206, 701/207, 214, 28; 342/46, 73, 357.01, 357.08; 356/375, 376, 385

(56) References Cited

U.S. PATENT DOCUMENTS 4,729,660 * 3/1988 Tsumura et al. ..................... 356/375
4,811,228   3/1989 Hyyppä ........................ 364/424.02

FOREIGN PATENT DOCUMENTS 2-48069   10/1990 (JP).
9-105628   4/1997 (JP).

\* cited by examiner

*Primary Examiner*—William A. Cuchlinski, Jr.
*Assistant Examiner*—Yonel Beaulieu
(74) *Attorney, Agent, or Firm*—Darby & Darby

(57) ABSTRACT

The position of a movable body is detected by emitting a laser light in all the directions around a truck as the movable body by means of an optical unit including a laser oscillator and a CCD camera, receiving the laser light reflected by reflectors disposed at a plurality of positions in a moving area, and making comparisons between comparison data being different at each position of the truck in the moving area and reference data of the received-light data at the plurality of positions in the moving area. The comparison data is obtained from a received-light luminance distribution of the reflected laser light and an angle θ obtained by a gyrosensor relative to a reference direction.

33 Claims, 16 Drawing Sheets

METHOD AND APPARATUS OF DETECTING A POSITION OF A MOVABLE BODY

BACKGROUND OF THE INVENTION

The present invention relates to a method for identifying a position of an automated guided movable body such as an automated guided vehicle on a field inside or outside of a factory, and to an apparatus of detecting a position of a movable body to be used in carrying out the method.

An automated guided vehicle is often used for transporting goods in a factory. In order to control travelling of the automated guided vehicle, it is necessary to identify the position and the travelling direction of the automated guided vehicle by means of a position detecting apparatus.

A movable body position detecting method and apparatus for identifying the position and the travelling direction of a movable body is disclosed, for example, in Japanese Patent Application Laid-open No. 09-105628/1997.

FIG. 1 is a block diagram showing a construction of the movable body position detecting apparatus disclosed in Japanese Patent Application laid-open No. 09-105628/1997. FIG. 2 is a perspective view showing an overall construction of the apparatus. The movable body position detecting apparatus includes a recognizing and identifying circuit 20 provided with a recognizing means 211 and a position calculating means 24, and an optical unit 10 disposed before the recognizing and identifying circuit 20. The position of a truck 30, which is a movable body, is detected by detecting the reflectors Hi by the optical unit 10 and analyzing the detection results by the recognizing and identifying circuit 20.

Three or more reflectors Hi are mounted on wall surfaces of a travelling area of the movable body. The reflectors Hi are formed by separately painted reflecting portions and non-reflecting portions so as to provide respective specific barcode-like marks formed by the reflecting portions and the non-reflecting portions arranged as horizontal bars with intervals and thicknesses different from each other.

FIG. 3 is an enlarged vertical cross-sectional view showing a construction of an essential part of the optical unit 10. The optical unit 10 is mounted on the truck 30 via a frame 31, and includes a laser oscillator 11 for outputting a laser light, an image sensor 121 for receiving the laser light reflected from the outside, a horizontally rotating turn table 131 for mounting these elements, and other elements. A tubular polygon mirror 17 having a regular polygonal shape in its vertical cross section and formed by a combination of a plurality of mirror plates 17c is mounted in front of the laser oscillator 11 so as to be vertically rotatable. A cover 131c for cutting off the outside light is mounted on the upper surface of the turn table 131, and an aperture 131c1 is disposed in a side surface of the cover 131c for irradiating and receiving the laser light.

The laser light irradiated from the laser oscillator 11 and reflected by the polygon mirror 17 travels through a half mirror 17b and is reflected by a tilted mirror 17a to exit through the aperture 131c to the outside. The laser light is reflected by the reflector Hi and passes through the aperture 131c1 to be reflected by the tilted mirror 17a and the half mirror 17b to be incident into the image sensor 121.

Since the polygon mirror 17 is rotating, the laser light exiting through the aperture 131c1 moves downwards by a predetermined distance while the laser light is hitting one mirror plate 17c. Further, since the optical unit 10 is rotated by means of the turn table 131, the laser light is also rotated to irradiate surroundings of the truck 30.

The laser light is reflected only when the laser light passes the reflector Hi, and the reflected light is incident into the image sensor 121. Also, since the irradiation of the laser light changes downwards, the reflector Hi is scanned over its entire width in the vertical direction. The data of the pattern of the scanned reflector Hi are input from the image sensor 121 to the recognizing means 211. The reflector Hi is identified by making reference to the data of the patterns previously stored in a storage means 221, and its coordinate values are obtained. In addition, an output at the scanning time from an encoder 15 mounted on a rotating shaft of the turn table 131 is input into an angle calculating means 25 to calculate an angle $\theta i$ of the direction of the reflector Hi relative to a reference direction.

Hereafter, a procedure for identifying the position of the movable body will be explained. FIG. 4 is an explanatory view showing positional relationship between the movable body and the scanned three reflectors. FIG. 5 is an explanatory view showing a procedure for identifying the position according to the prior art. Three or more reflectors Hi are scanned in the above-mentioned manner to determine their coordinate values Ai and their angles $\theta i$ relative to the reference direction. From the coordinate values Ai of the scanned reflectors Hi, three points A1, A3, A5 are selected, and the two points A1, A3 and the two points A3, A5 are respectively connected with a line. Here, the three points A1, A3, A5 are selected so that the angle $\theta k$ at each point satisfies $0°<\theta k<180°$. Two circles E1a, E1b and two circles E2a, E2b are determined having the lines as their chords and having the angle $\theta a$ between A1 and A3 and the angle $\theta b$ between A3 and A5 as their angles of circumference.

The intersecting points of the circles E1a, E1b, E2a, E2b are determined, and four points P1, P2, P3, P4 other than A1, A3, A5 are determined. The position of the truck 30 can be identified as one of the intersecting points P1, P2, P3, P4. For example, in order that the intersecting point P1 of the circles E1a, E2a is appropriate as representing the position of the truck 30, the intersecting point P1 must satisfy the following conditions simultaneously.

1. The coordinates of the intersecting point P1 lie within an area that the truck 30 can travel.

2. The intersecting point P1 lies on the same side as the center T1a of the circle E1a relative to the line segment connecting the points A1, A3 if the angle $\theta a<90°$, and lies on the different side from the center T1a relative to the line segment connecting the points A1, A3 if the angle $\theta a>90°$.

3. The intersecting point P1 lies on the same side as the center T2a of the circle E2a relative to the line segment connecting the points A3, A5 if the angle $\theta b<90°$, and lies on the different side from the center T2a relative to the line segment connecting the points A3, A5 if the angle $\theta b>90°$.

4. The points A1, A3, A5 are arranged clockwise in this order from the reference direction with the intersecting point P1 being the center when scanned clockwise.

Here, the conditions 2, 3 are based on the fact that the intersecting point P1 is an intersecting point of the circles E1a, E2a. Therefore, the one point appropriate as the position of the truck 30 can be identified by observing the fact that the intersecting point P2 is the intersecting point of the circles E1b, E2b, the intersecting point P3 is the intersecting point of the circles E1b, E2a, and the intersecting point P4 is the intersecting point of the circles E1a, E2b, and examining whether similar conditions are satisfied at each intersecting point. Also, the direction of the truck 30 can be determined on the basis of the angle $\theta 1$ of the coordinates A1 relative to the reference direction N as viewed from the intersecting point P1 thus identified.

In the meantime, according to the conventional movable body position detecting method and apparatus as described above, the position of the movable body is identified based on triangulation, so that it is necessary to determine which of the reflectors numerously disposed in the moving area the detected reflector is. For this reason, it is necessary that each reflector includes a mark such as a barcode specific to the each reflector, the reflector is scanned by scanning the wall surfaces both horizontal rotating direction and vertically by means of the laser light, and each reflector is identified by means of the read mark.

Further, since the wall surface is scanned sequentially in the rotating direction of the turn table, a time difference occurs in detecting the plurality of reflectors. Since the movable body is moving during a period of time between detection of one reflector and detection of the next reflector, the detecting error will become larger if the position of the truck is detected by using this detection result. Also, the process will be complex ir the position of the truck is calculated by taking the moving distance of the movable body into consideration in order to avoid this detecting error.

Moreover, since the apparatus includes a rotating mechanism for a turn table, the apparatus is large in size and the costs of the electric power supply and others are high.

Further, the detecting error becomes larger due to the looseness caused by backlash sliding abrasion of the rotating section or the like.

Also, if the detecting apparatus is used in a clean room, it will be a source of dust generation due to the sliding movement of the movable parts.

BRIEF SUMMARY OF THE INVENTION

Ihe present invention has been made in view of these circumstances and an object thereof is to provide a method and apparatus of detecting a position of a movable body that can eliminate the need for identifying which of the reflectors the detected reflector is in identifying the position of the movable body and the need for using a rotating mechanism to scan all the directions around the movable body.

The present invention provides a method of detecting a position of a movable body comprising the steps of: emitting light to outside of said movable body by means of a light emitting apparatus provided with said movable body; receiving said light, which is reflected by a plurality of reflectors provided with a moving area of said movable body, by means of a light receiving apparatus provided with said movable body for obtaining an electric output corresponding to an intensity of said received light; comparing a received-light luminance distribution along a circumferential direction of said movable body, which is obtained from the received-light output, with reference received-light luminance distributions stored in advance in association with a plurality of positions in said moving area of said movable body; and detecting the position of said movable body in accordance with a comparison result.

According to the method of the present invention, the position and direction having the highest similarity of the distribution pattern is determined as being the nearest to the actual position and direction of the movable body in accordance with a comparison result in each position and direction, obtained by comparing a received-light luminance distribution acquired by the light receiving apparatus, with reference received-light luminance distributions stored in advance in association with a plurality of positions in the moving area. This eliminates the need for determining which of the reflectors numerously disposed in the moving area the detected reflector is, and the need for making contrivances such as attaching a specific mark on each of the reflectors.

The method of the present invention is characterized in that said reference received-light luminance distributions are given in a state in which said movable body turns towards a predetermined reference direction, said method further comprising the steps of: detecting an angle of a moving direction of said movable body relative to said reference direction by an angle detecting means provided with said movable body; correcting the received-light luminance distribution obtained by said light receiving apparatus into the received-light luminance distribution when the movable body turns towards said reference direction, by utilizing the detected angle; and comparing the corrected received-light luminance distribution with said reference received-light luminance distributions.

According to the method of the present invention, only the reference received-light luminance distributions in a state of turning towards the reference direction are needed, whereby the amount of storage in the storage means is reduced and also the number of comparisons to be made with the received-light distribution obtained by the light receiving apparatus is reduced.

The method of the present invention is characterized in that the plurality of positions in the moving area provided with association with said reference received-light luminance distributions are respective apexes of meshes formed by polygons of the same shape that divide the moving area.

According to the method of the present invention, the distribution of the positions in the moving area is made uniform by allowing the positions provided with association with the reference received-light luminance distributions to be apexes of meshes formed by polygons of the same shape. If the distribution of the positions provided with association with the reference received-light distributions is unbalanced in different parts of the moving area, the precision of detecting the position of the movable body is high at a part where said positions are densely distributed, and the precision of detecting the position of the movable body is low at a part where said positions are sparsely distributed. Therefore, the precision of detecting the position of the movable body is made uniform by allowing the distribution of the positions to be uniform.

The method of the present invention is characterized by further comprising the steps of: determining a similarity between said received-light luminance distribution and each of said reference received-light luminance distributions by said comparison; selecting an apex having the highest similarity from the apexes of said meshes in the moving area; selecting a plurality of polygons having said selected apex as one of apexes thereof; selecting a polygon having the largest sum of similarities associated with the apexes of the polygon, from said selected polygons; determining, for each side of said selected polygon, three points in a three-dimensional space having a coordinate axis which is perpendicular to a plane of moving of said movable body and which represents said similarity, at three points located on the plane of moving and including two apexes at two ends of said side of said selected polygon and one apex of the mesh located opposite to said selected polygon relative to said side of said selected polygon; determining a plane that passes through said three points in said three-dimensional space for said side of said selected polygon; determining an intersecting point of each combination of three planes selected from the planes determined for all the sides constituting said selected polygon; and determining the position of the movable body as an average of all the determined intersecting points.

According to the method of the present invention, the similarity between the received-light luminance distribution obtained by the light receiving apparatus and each of the reference received-light luminance distributions provided with association with the positions in the moving area is determined to select a polygon having the largest sum of the similarities at the apexes of the polygon. Since the point having the largest similarity lies within the selected polygon, the position of the movable body also lies within the selected polygon. Therefore, the similarities at two apexes at two ends of a side of the polygon are larger than the similarity at one position opposite to the polygon relative to said side of the polygon. A plane that passes through the three points corresponding to said two apexes and said one position in a three-dimensional space having a coordinate axis which is perpendicular to a plane of moving of said movable body and which represents said similarity, is determined. The intersecting point of arbitrary three planes selected from the planes determined for all the sides constituting said selected polygon can be inferred as the position having the largest similarity within the polygon. Therefore, an average of the intersecting points determined for all the combinations of the three planes selected from all the planes is determined as the position of the movable body, thereby providing highly precise position detecting.

The method of the present invention is characterized in that the positions associated with said reference received-light luminance distributions are selected as comparison targets in accordance with the detected position and moving direction of said movable body.

According to the method of the present invention, the positions for making comparisons are selected from all the positions associated with the reference received-light luminance distributions, thereby reducing the number of times for making comparisons.

The method according to the present invention is characterized in that said positions associated with said reference received-light luminance distributions and selected as comparison targets are positions contained within an ellipse with its major axis being a line segment connecting the detected position of said movable body with a point located at the maximum distance that said movable body can travel within a predetermined period of time in the moving direction, and with its shorter axis being a line segment having a length of a predetermined ratio relative to the length of the longer axis.

According to the method of the present invention, the area where the movable body exists is guessed by allowing the selection range of the points as comparison targets to be the area within an ellipse with its major axis being a line segment connecting the previously detected position of the movable body with a point located at the maximum distance that the movable body can travel within a predetermined period of time in the moving direction, and with its minor axis being a line segment having a length of a predetermined ratio relative to the length of the major axis, thereby reducing the number of times for making comparisons.

The method of the present invention is characterized in that said positions associated with said reference received-light luminance distributions and selected as comparison targets are positions contained within a fan-shaped region with its center located at the previously detected position of said movable body, its radius being the maximum distance that said movable body can travel within a predetermined period of time, and its central angle being a predetermined angle having the previously detected direction of said movable body in the middle of the angle.

According to the method of the present invention, the area where the movable body exists is guessed by allowing the selection range of the points as comparison targets to he the area within a fan-shaped region with its center being at the previously detected position of said movable body, its radius being the maximum distance that said movable body can travel within a predetermined period of time, and its central angle being a predetermined angle having the previously detected direction of said movable body in the middle of the angle, thereby reducing the number of times for making comparisons.

The present invention provides an apparatus of detecting a position of a movable body comprising: a light emitting apparatus provided with a movable body; a light receiving apparatus provided with said movable body for obtaining an electric output corresponding to an intensity of received light; a storage medium; and a controller for calculating a position of said movable body in accordance with the output obtained by receiving, by means of said light receiving apparatus, the light emitted from said light emitting apparatus and reflected by a plurality of reflectors disposed at appropriate positions in a moving area of said movable body, wherein said controller is coupled to said storage medium and capable of performing the operations of: reading, from said storage medium, reference received-light luminance distributions at a plurality of positions in said moving area of said movable body; and comparing a received-light luminance distribution obtained by said light receiving apparatus, with said reference received-light luminance distributions to calculate the position of said movable body.

According to the apparatus of the present invention, the received-light luminance distribution and the reference received-light luminance distributions are compared by the comparison means, and the position of the movable body is calculated by the calculation means based on the comparison result. In other words, the position of the movable body is determined by pattern matching between the received-light luminance distribution and the reference received-light luminance distributions. This eliminates the need for determining which of the reflectors numerously disposed in the moving area the detected reflector is, and the need for making contrivances such as attaching a specific mark on each of the reflectors.

The apparatus according to the present invention is characterized in that said light emitting apparatus comprises a light source unit and an irradiating unit for reflecting and rotating the light emitted by said light source unit to radiate the light in all directions around the movable body.

According to the apparatus of the present invention, the position detecting can be carried out by pattern matching by utilizing the movable body position detecting apparatus equipped with a conventional rotating mechanism.

The apparatus or the present invention is characterized in that said light emitting apparatus comprises a light source unit and an irradiating unit for simultaneously irradiating the light emitted by said light source unit in all directions around the movable body.

According to the apparatus of the present invention, the light can he simultaneously irradiated in all the directions around the movable body, so that there will be no time difference in irradiating the light to a plurality of reflectors. This reduces the detecting errors in detecting the position of the movable body by simultaneously receiving the light from the plurality of reflectors.

The apparatus of the present invention is characterized in that said light receiving apparatus comprises a reflector for reflecting the light from around the movable body, a condensing unit for rotating said reflector to condense the light from all directions around the movable body into an annular light, and a light receiving unit for receiving the light condensed by said condensing section.

According to the apparatus of the present invention, the position detecting can be carried out by pattern matching by utilizing the movable body position detecting apparatus equipped with a conventional rotating mechanism.

The apparatus of the present invention is characterized in that said light receiving apparatus comprises a condensing unit for condensing the light from all directions around the movable body simultaneously into an annular light, and a light receiving unit for receiving the light condensed by said condensing section.

According to the movable body position detecting apparatus of the present invention, the lights from all the directions around the movable body are simultaneously condensed into an annular light by the condensing unit and is received by the light receiving unit. This allows the directions of a plurality of reflectors to be detected without any time difference, whereby no errors occur in detecting the position of the movable body.

Also, the lights from all the directions can be simultaneously received without the need for providing a rotating mechanism, so that the controlling period can be made shorter and the responsiveness of the control can be increased.

Furthermore, since the rotating mechanism and the power supply for driving the rotating mechanism are not required, the apparatus can be prevented from becoming larger in size, thereby reducing the costs of the apparatus.

The above and further objects and features of the invention will more fully be apparent from the following detailed description with accompanying drawings.

DETAILED DESCRIPTION OF THE INVENTION

Figure 1:
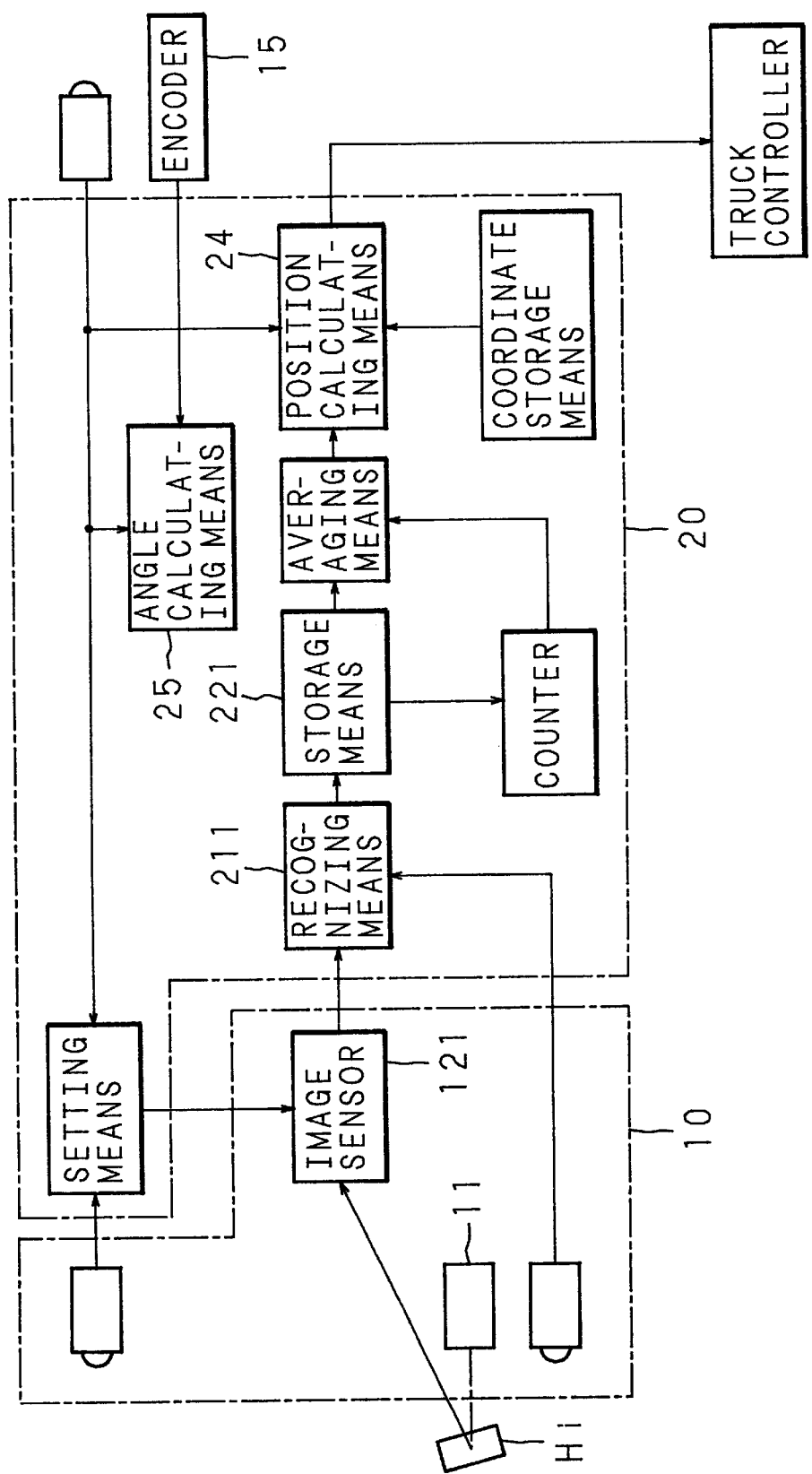
FIG. 1 is a block diagram showing a construction of a conventional movable body position detecting apparatus.
Figure 2:
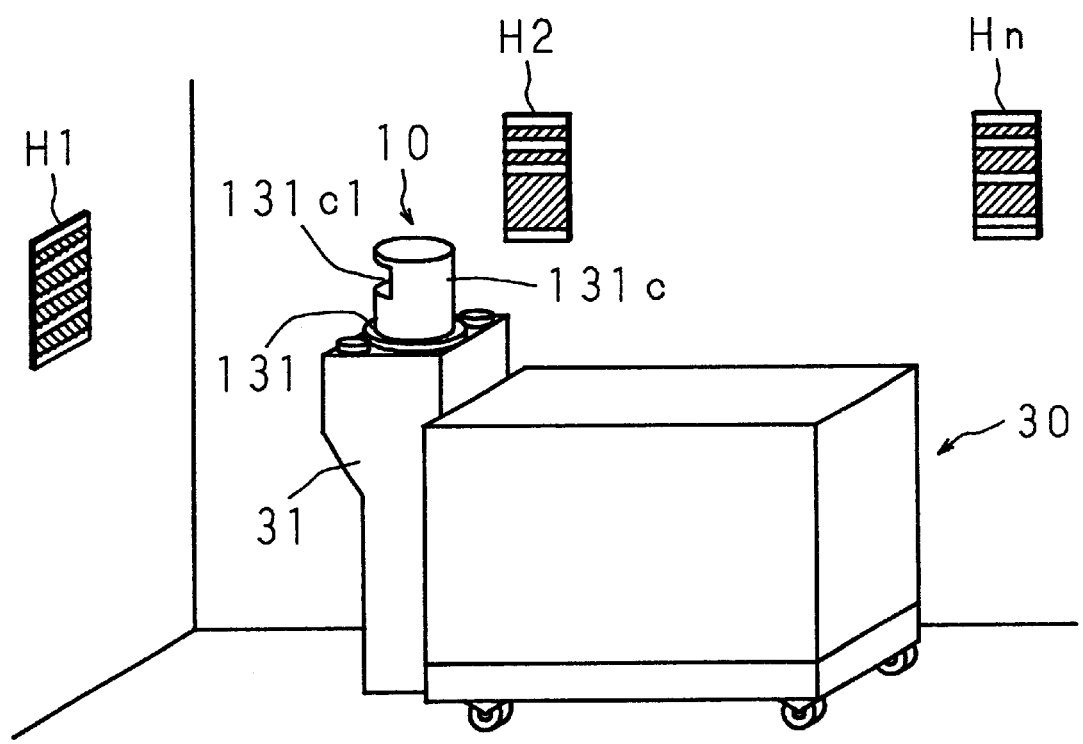
FIG. 2 is a perspective view showing a construction of a conventional movable body position detecting apparatus.
Figure 3:
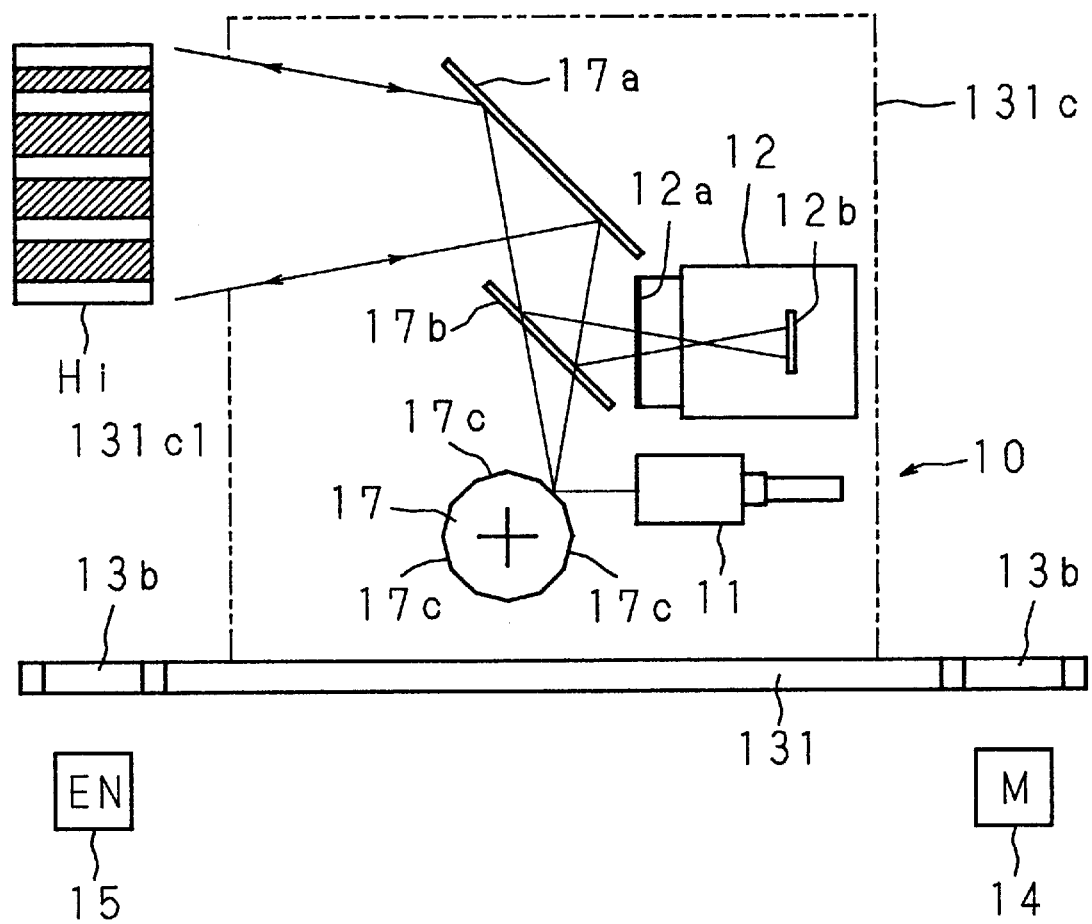
FIG. 3 is an enlarged vertical cross-sectional view showing a construction of an essential portion of an optical unit.
Figure 4:
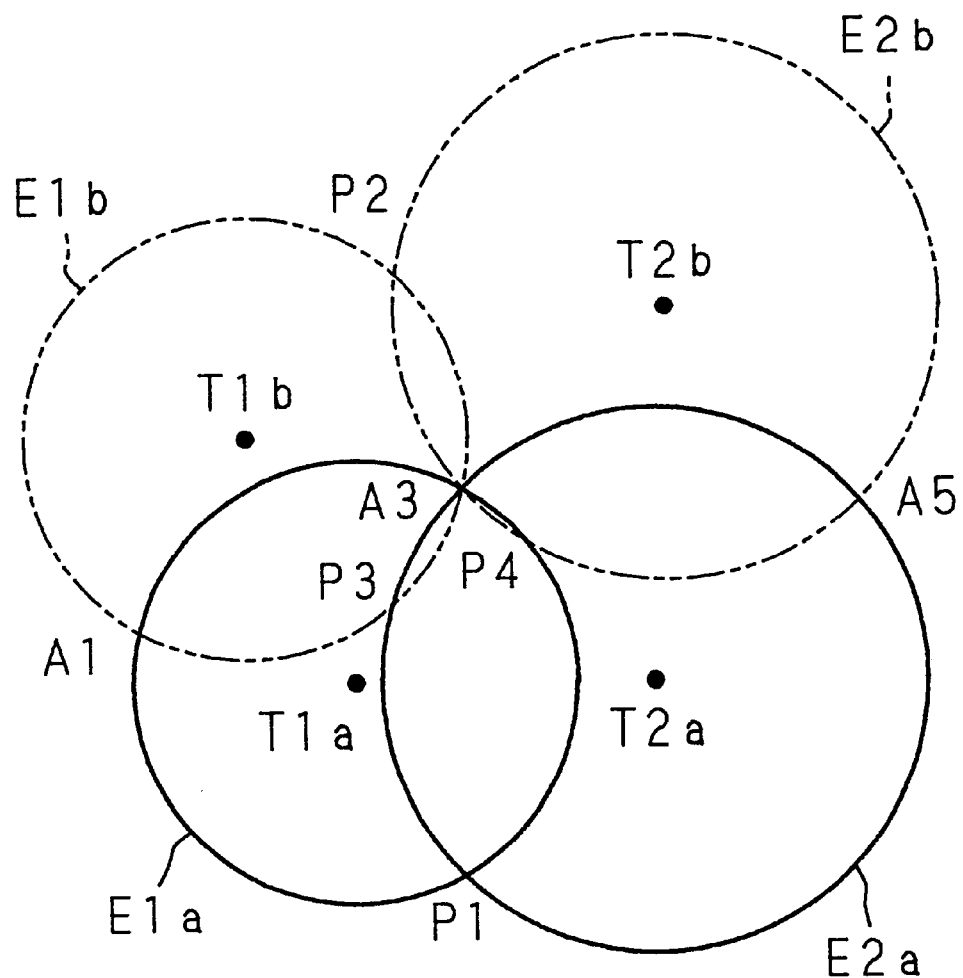
FIG. 4 is an explanatory view showing a positional relationship of a movable body and three scanned reflectors.
Figure 5:
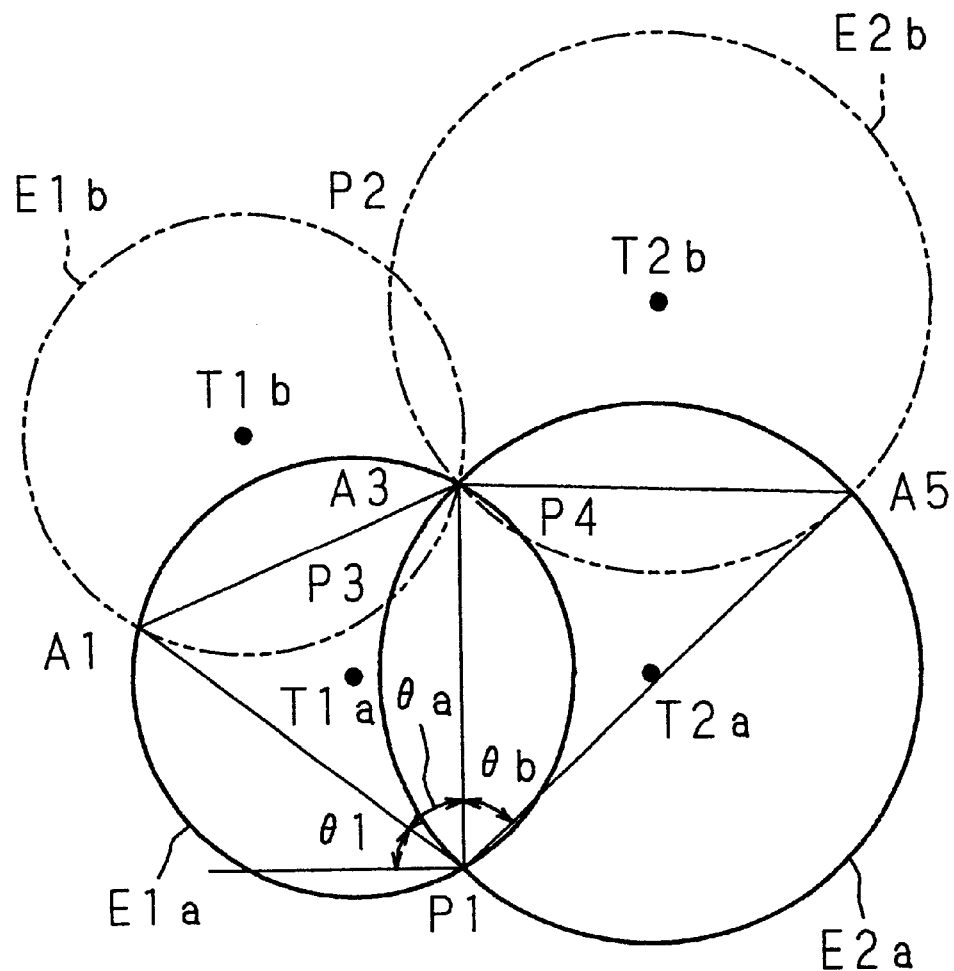
FIG. 5 is an explanatory view showing a position specifying procedure of the prior art.
Figure 6:
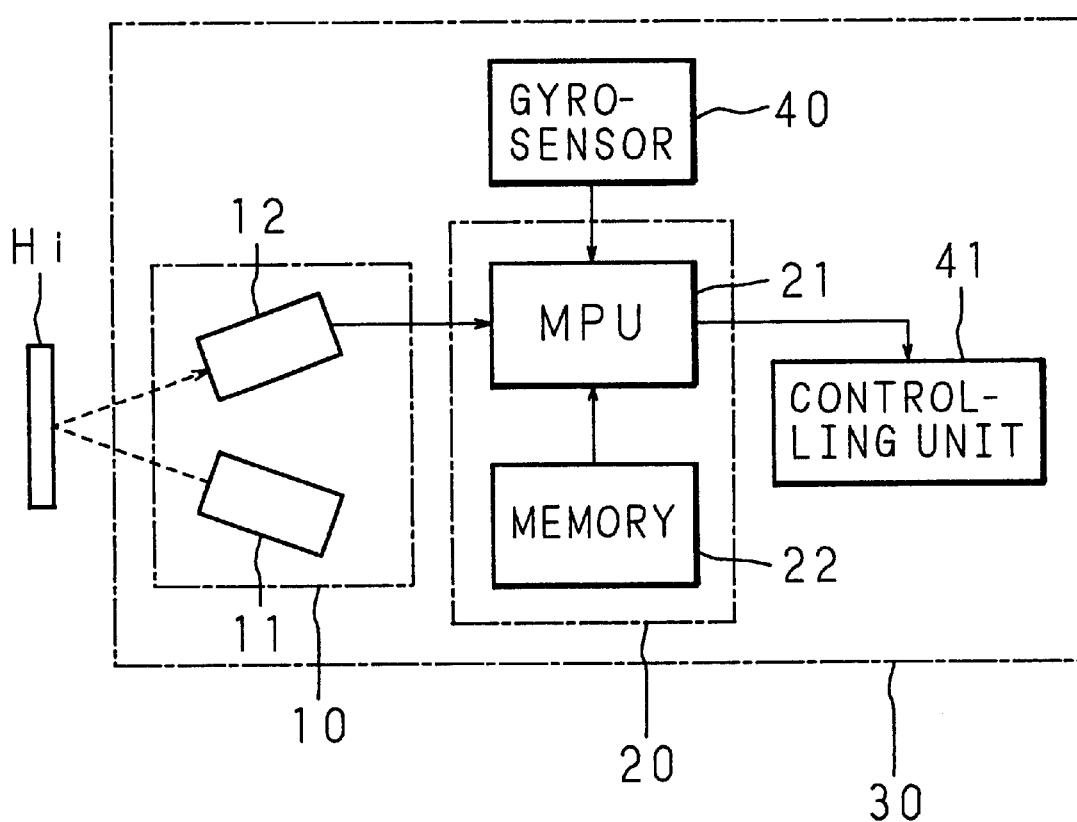
FIG. 6 is a block diagram showing a construction of an essential part of an embodiment of a movable body position detecting apparatus according to the present invention.

Hereafter, the present invention will be described in detail with reference to the attached drawings showing embodiments thereof. FIG. 6 is a block diagram showing a construction of an essential part of an embodiment of a movable body position detecting apparatus according to the present invention. Referring to FIG. 6, a truck 30 is shown. The truck 30 constituting a movable body is equipped with an optical unit 10 including a laser oscillator 11 and a CCD camera 12, a position identifying unit 20 including an MPU 21 and a memory 22, and a gyrosensor 40. Data obtained by the optical unit 10 and the gyrosensor 40 are analyzed by the position identifying unit 20 to detect the position of the truck 30 at a predetermined period and to control the travelling of the truck 30 by giving the detected position information to a controlling unit 41.

Figure 7:
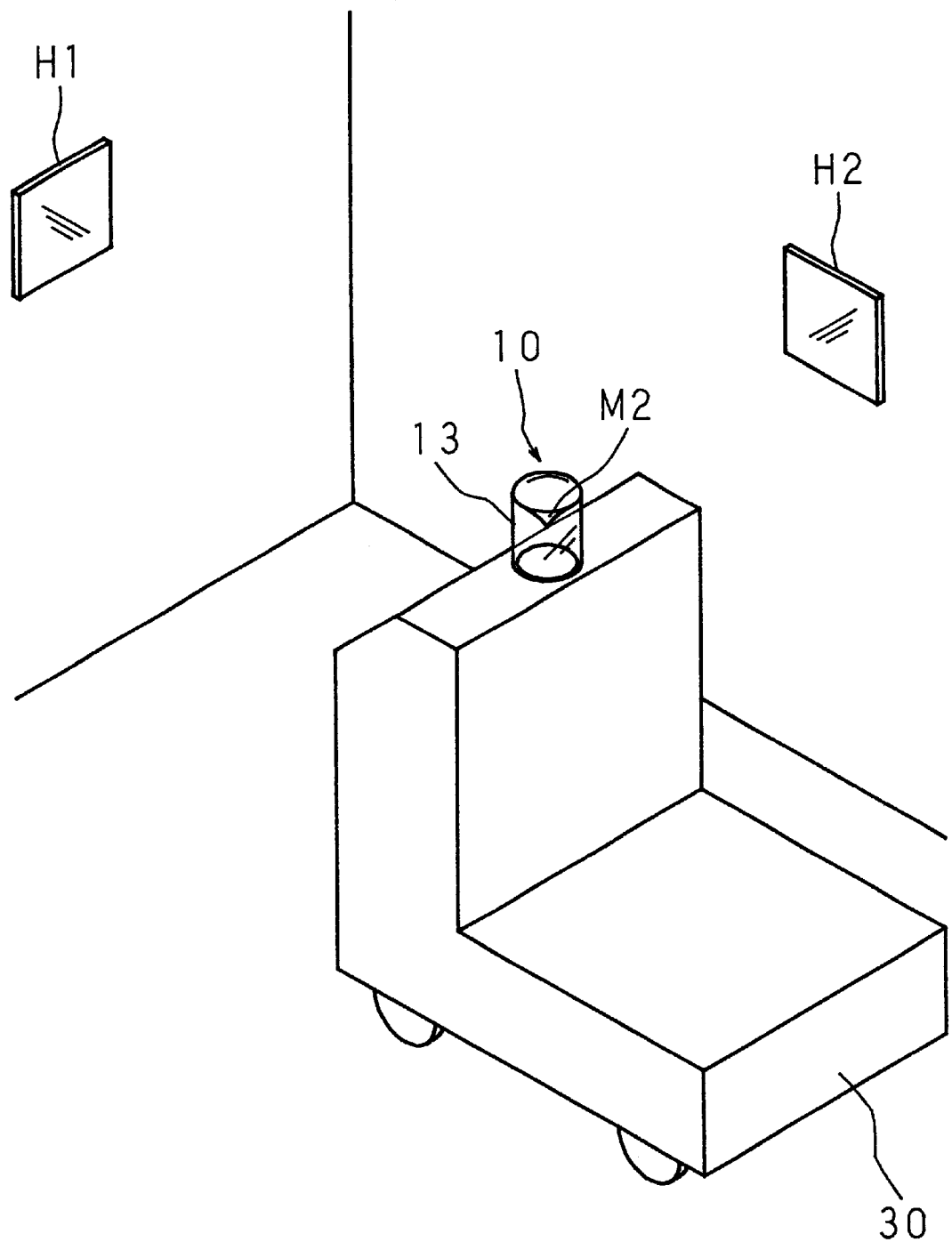
FIG. 7 is a perspective view showing an overall construction of a truck which is a movable body.

FIG. 7 is a perspective view showing an overall construction of the truck 30. The optical unit 10 is mounted on an upper portion of the truck 30. Reflectors Hi performing a retro reflection of incident light are mounted at a plurality of positions having the same height on wall surfaces of the moving area where the truck 30 moves.

Figure 8:
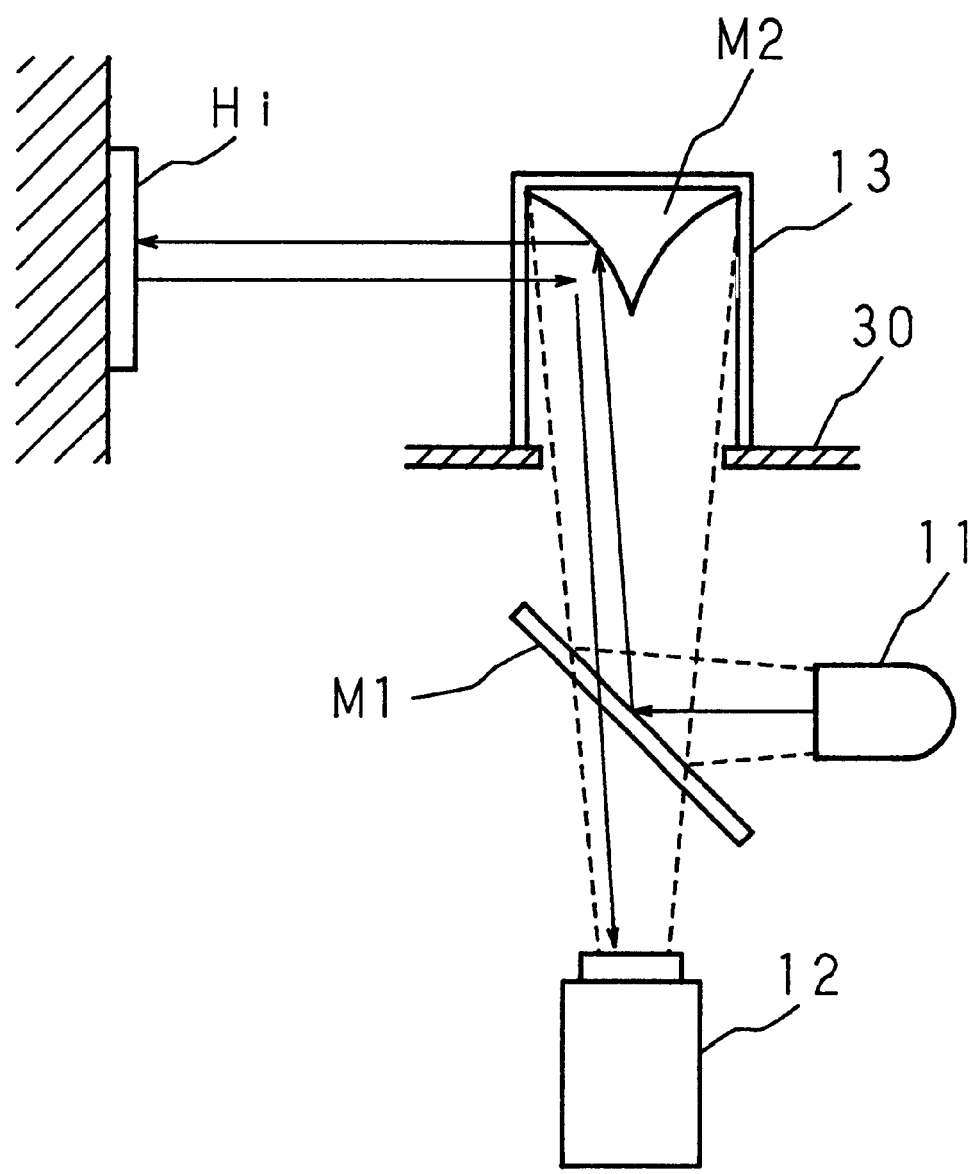
FIG. 8 is a schematic view showing a construction of an optical unit.

FIG. 8 is a schematic view showing a construction of the optical unit 10. The laser oscillator 11 is mounted inside the truck 30 so as to emit laser light in a horizontal direction. A half mirror M1 is mounted in front of the laser oscillator 11 so as to reflect the horizontally incident laser light in an upward direction. Above the half mirror M1, a cylindrical transparent supporting member 13 in depth is protrudingly mounted bottom up on an upper portion of the truck 30. A trumpet-shaped irradiating mirror M2 having a mirror surface on its outside is supported on the inside bottom of the supporting member 13 with its pointing end facing downwards. The irradiating mirror M2 has a generatrix of a shape of a quarter arc and the mirror surface extends up to the pointing end of the irradiating mirror M2. Below the half mirror M1, a CCD camera 12 is mounted for receiving the light coming downwards with an upper portion of its screen being oriented in the moving direction of the truck 30.

The light emitted from the laser oscillator 11 is reflected upwards by the half mirror M1, and is further reflected horizontally by the irradiating mirror M2. The light emitted by the laser oscillator 11 is diffused by a lens. Further, a shielding is disposed in front of the laser oscillator 11 and is arranged to block a central portion of the laser light so that an annular light coaxial with the irradiating mirror M2 may come into a central portion of the arc-like surface of the irradiating mirror M2. Therefore, a slightly diffused annular laser light comes like a hand with a constant width in the arc-like surface of the irradiating mirror M2 to be reflected in a horizontal direction. Since the mirror surface of the irradiating mirror M2 is concave, the irradiating light from the irradiating mirror M2 is not diffused, whereby generally all of the laser light is irradiated in a horizontal direction.

Here, the irradiating mirror M2 may have a conical shape, although this causes some of the irradiating light to be diffused.

The light irradiated in all the horizontal directions from the irradiating mirror M2 is reflected by the reflectors Hi located on the walls around the truck 30. The light is retro reflected to the truck 30 and comes into the band-like portion of the irradiating mirror M2 to be further reflected downwards. At this time, since the mirror surface of the irradiating mirror M2 is concave, the light incident in the horizontal direction is condensed downwards. The degree of convergence of the light is adjusted to be about the same as the degree of diffusion by the lens. This allows the light to he condensed by passing through the same path as the diffused light, in an opposite direction. The condensed light is transmitted through the half mirror M1 to be incident into the CCD camera 12. The CCD camera 12 is positioned so that the distance between the CCD camera 12 and the half mirror M1 is about the same as the distance between the oscillator 11 and the half mirror M1, whereby the light incident into the CCD camera 12 is condensed to the same degree as the light immediately after being emitted from the laser oscillator 11.

Figure 9:
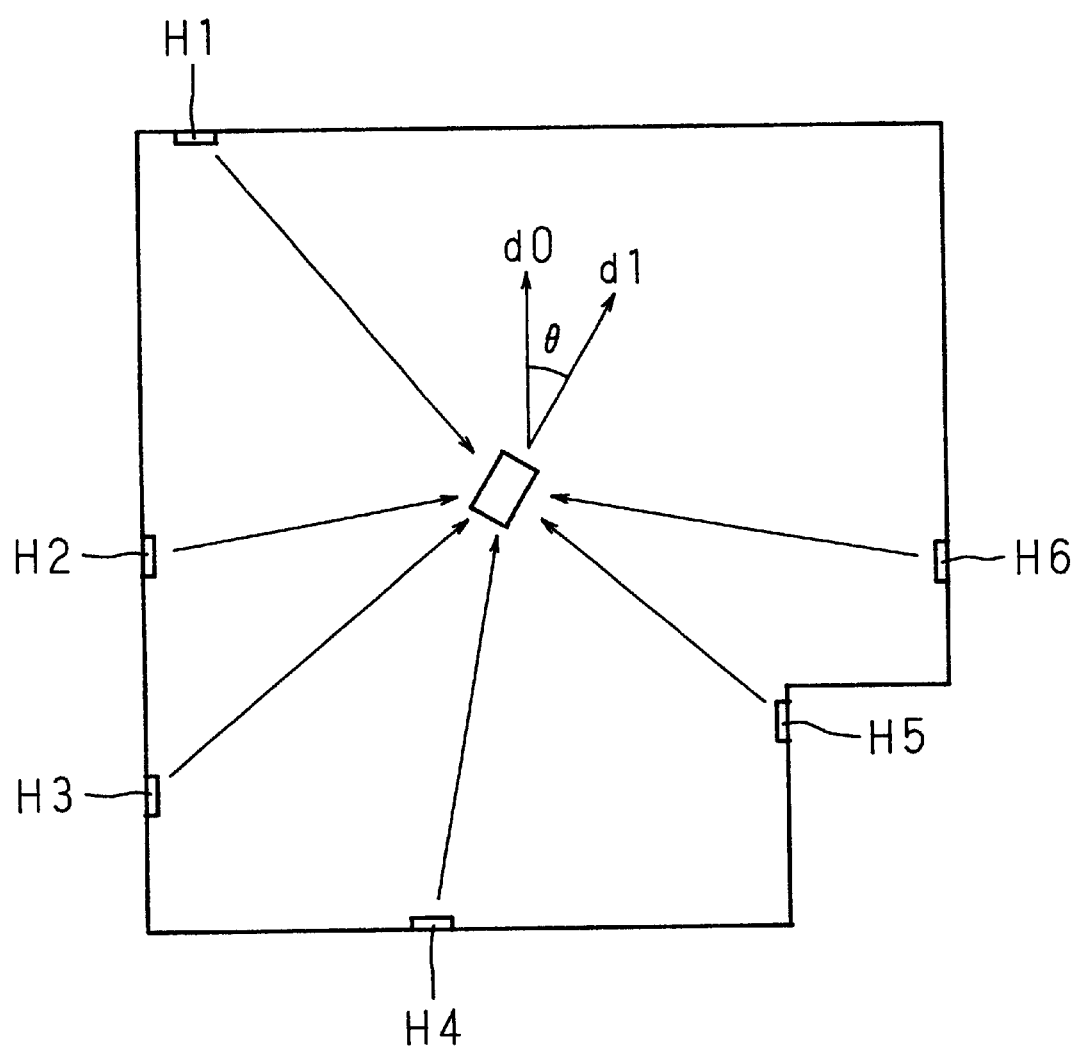
FIG. 9 is an explanatory view showing a positional relationship of the truck moving in a moving area.

FIG. 9 is an explanatory view showing a positional relationship of the truck 30 moving in the moving area. Reflectors H1 to H6 are mounted on the wall surfaces of the moving area. The truck 30 is moving in a moving direction d1 tilted at an angle θ relative to a reference direction d0.

The light irradiated by the irradiating mirror M2 is reflected by the reflectors H1 to H6 to return to the truck 30.

Figure 10:
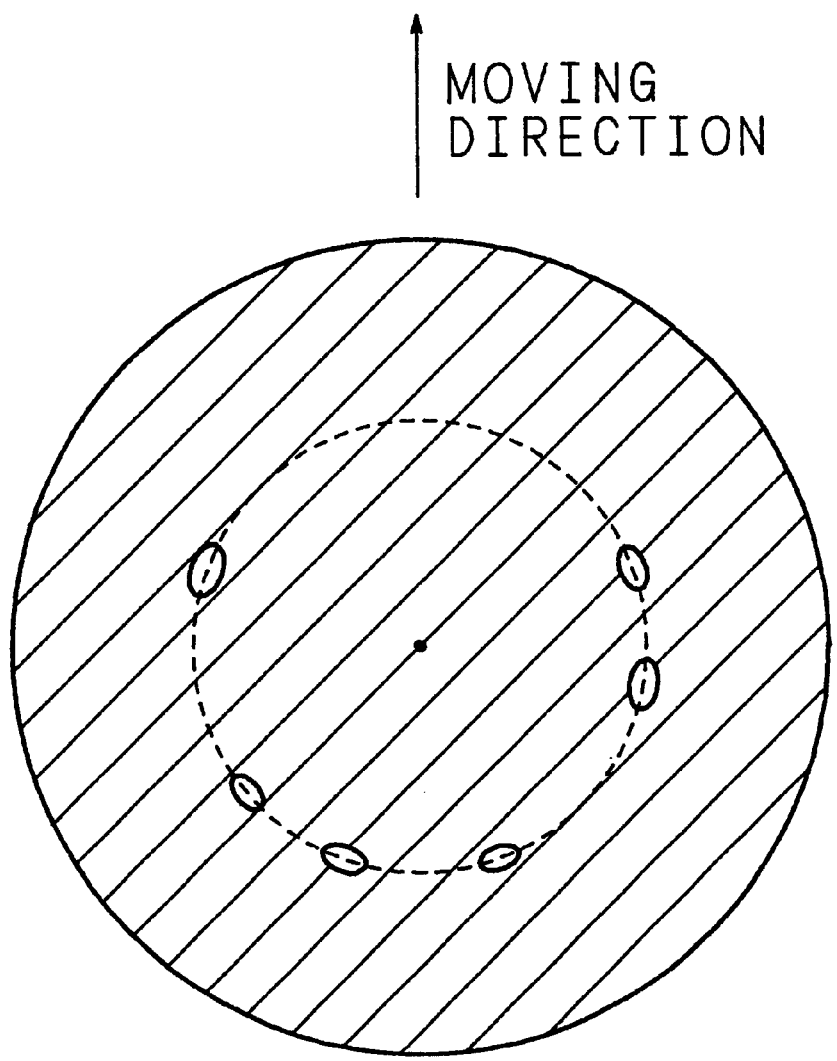
FIG. 10 is a schematic view showing an image captured by a CCD camera at a position shown in FIG. 9.

FIG. 10 is a schematic view showing a gray-scale image captured by the CCD camera 12 of the truck 30 at the position shown in FIG. 9. Since the light reflected by the reflectors H1 to H6 is condensed into the CCD camera 12 by passing through the same path as the light emitted from the laser oscillator 11 in an opposite direction, the gray-scale image captured by the CCD camera 12 includes an image of the light on a concentric annulus which is located in the inside of a disk-like image of the irradiating mirror M2 shown in hatches and which has generally the same diameter as the annular light emitted from the laser oscillator 11. In addition, the gyrosensor 40 measures the angle θ of the moving direction d1 relative to the reference direction d0.

Figure 11:
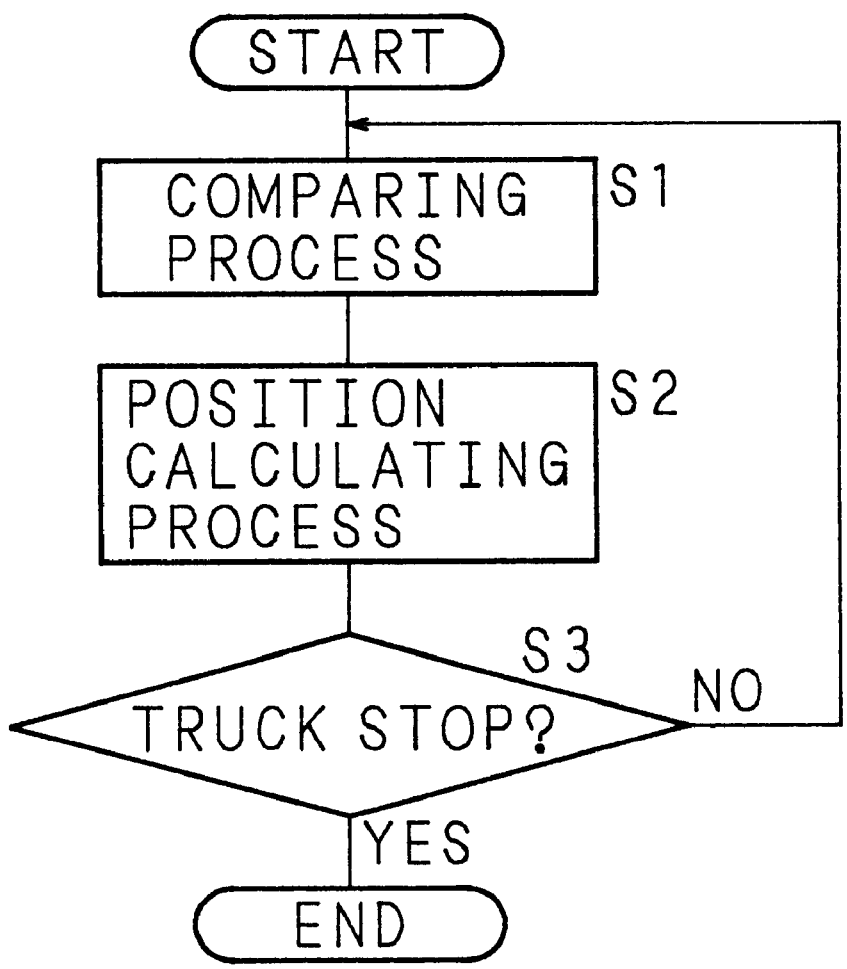
FIG. 11 is a flowchart showing a processing procedure in an MPU.

The image data obtained in this manner from the CCD camera 12 and the angle data θ obtained by the gyrosensor 40 are input into the MPU 21 of the position identifying unit 20. FIG. 11 is a flowchart for explaining a procedure of a process carried out in the MPU 21. The processing procedure in the MPU 21 includes a comparing process and a position calculating process. The comparing process (step S1) is carried out first, and then the position calculating process (step S2) is carried out. At the end of the position calculating process, the procedure is ended if the truck 30 is to be stopped. If the truck 30 is not to be stopped, the procedure goes into a standby state and when the next data are input, the procedure is started again from the comparing process (step S3).

Figure 12:
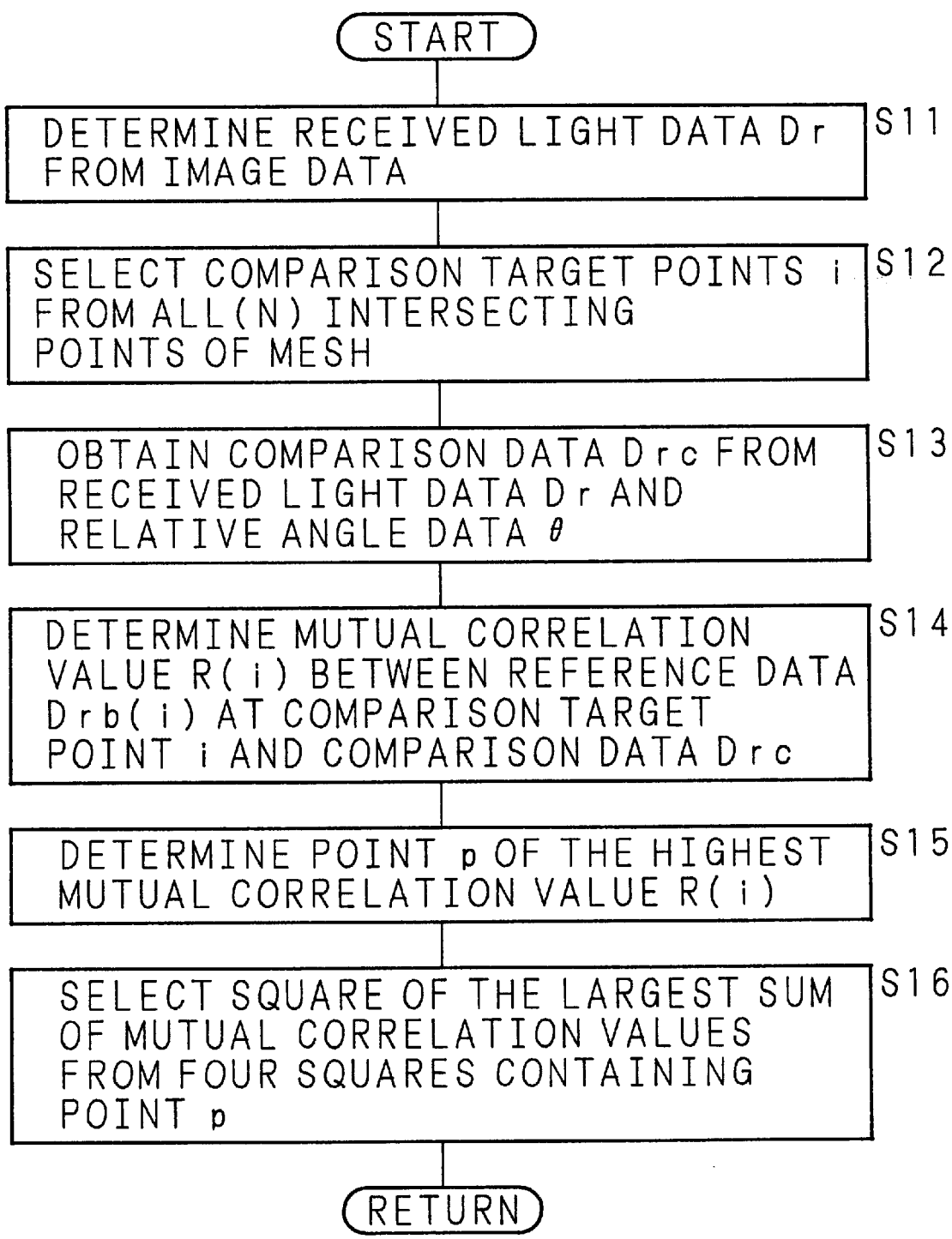
FIG. 12 is a flowchart showing a processing procedure in a comparing process.
Figure 13:
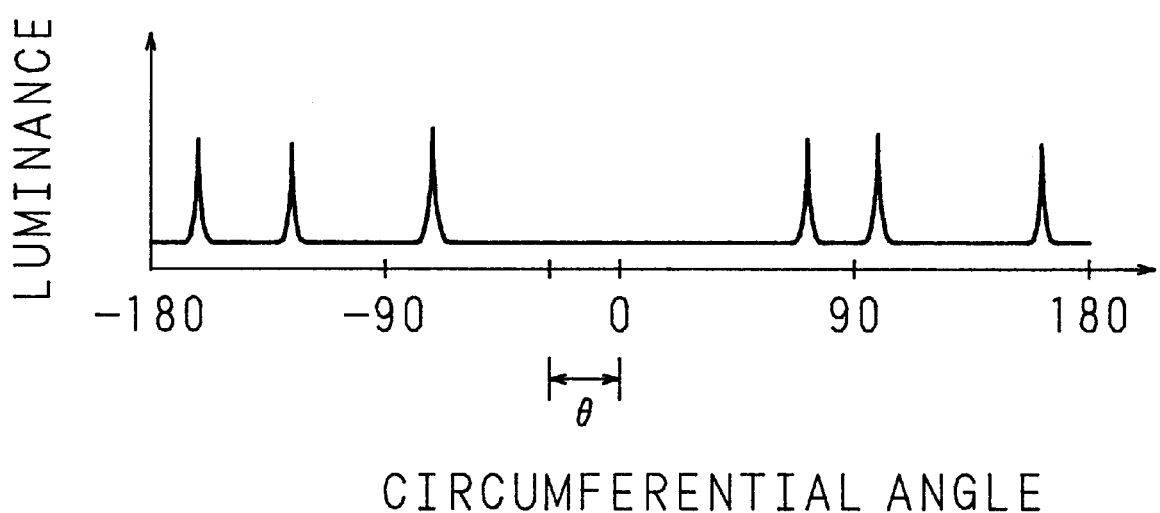
FIG. 13 is a schematic view showing data of a received light.

FIG. 12 is a flowchart for explaining a processing procedure in the comparing process. In the comparing process, received light data Dr showing a luminance distribution on the circumference of the captured image of light thereon are determined from the image data (step S11). FIG. 13 is a schematic view of the received light data Dr.

In FIG. 13, the vertical axis represents the luminance and the horizontal axis represents the angle from −180° to 180° in the circumferential direction of the truck 30 relative to the moving direction dl if the angle thereof is zero.

As described above, the captured images of the reflected light are located on a circumference of a circle which is concentric with the image of the irradiating mirror M2 in the image. Accordingly, from all the pixels in the image data, those having a pixel value higher than a predetermined threshold K obtained from the actual results are selected, and the distances from the selected pixels to a predetermined pixel corresponding to the central point of the irradiating mirror M2 in the image are calculated. Then, waveform data are obtained by plotting the luminance of each pixel on the circumference of the circle according to the circumferential angle from the moving direction d1, with its center at the above-mentioned central point and its radius being the average of the distances as determined above. Here, errors are likely to occur in determining the radius of the circumference, so that the length of the circumference may vary depending on the detecting period. This causes a difference in the number of pixels in the obtained waveform data, depending on the detecting period. Therefore, the data are enlarged or curtailed to adjust the number of pixels to be a predetermined value, whereby the received light data Dr are obtained.

Figure 14:
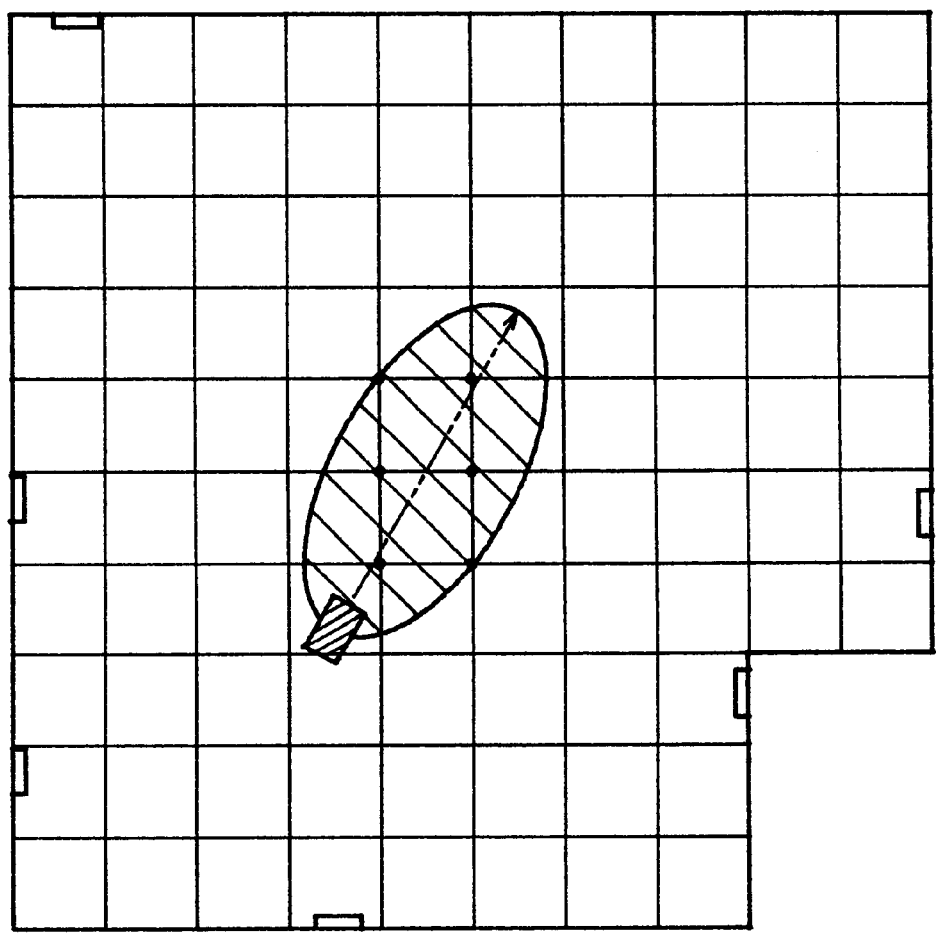
FIG. 14 is an explanatory view showing a method of selecting comparison target points.

In the position identifying unit 20, processes are carried out assuming that the moving area are meshed into a lattice at a predetermined interval, so that the position identifying unit 20 stores the coordinates of each intersecting point of the lattice. A plurality of comparison target points i are selected from all the intersecting points (N in the total number) stored in the position identifying unit 20 (step S12). FIG. 14 is an explanatory view showing a method of selecting the comparison target points i. The comparison target points i are all of the intersecting points located within an ellipse with its major axis being a line segment connecting the previously detected position of the truck 30 with the point at the maximum distance that the truck 30 can travel within the detecting period in the previously detected moving direction, and with its minor axis being a line segment having half of the length of the major axis.

Then, the received light data Dr determined in the step S11 are shifted by the angle θ to obtain a waveform showing a state in which the truck 30 turns to the reference direction d0, whereby comparison data Drc are obtained (step S13).

The received light data at each point n in the meshes of the moving area with the truck 30 turning to the reference direction d0 are stored in advance in the memory 22 as reference data Drb(n). A mutual correlation value R(i) between the reference data Drb(i) and the comparison data Drc at the comparison target point i is determined (step S14).

Next, a point p having the highest mutual correlation value R(i) is determined from the comparison target points i (step S15). A square having the largest sum of the mutual correlation values R(j) at the four corner points j of the square is selected from the four squares containing the point p (step S16). The procedure then goes to the position calculating process.

Figure 15:
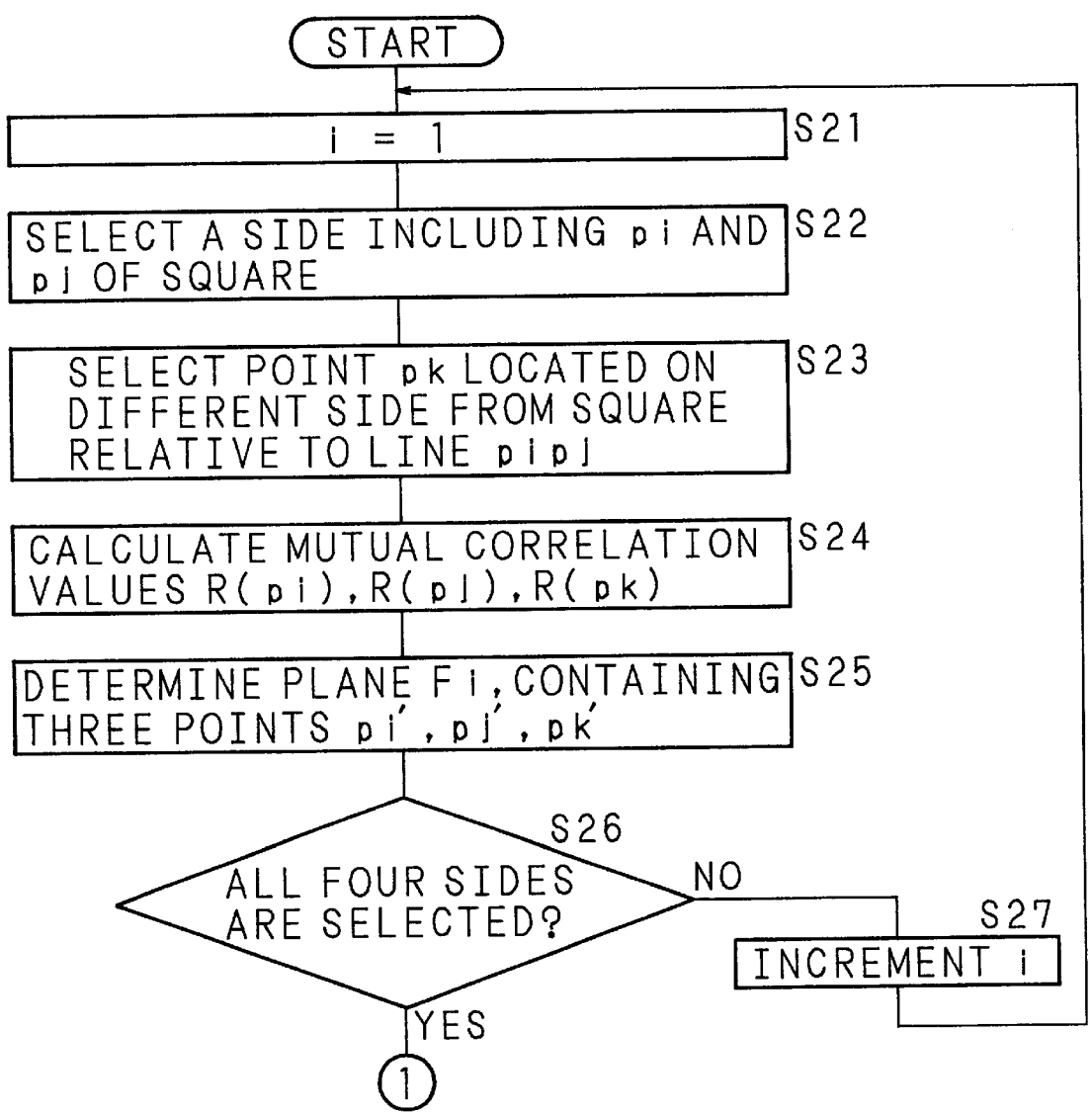
FIG. 15 is a flowchart showing a processing procedure in a position calculating process.
Figure 16:
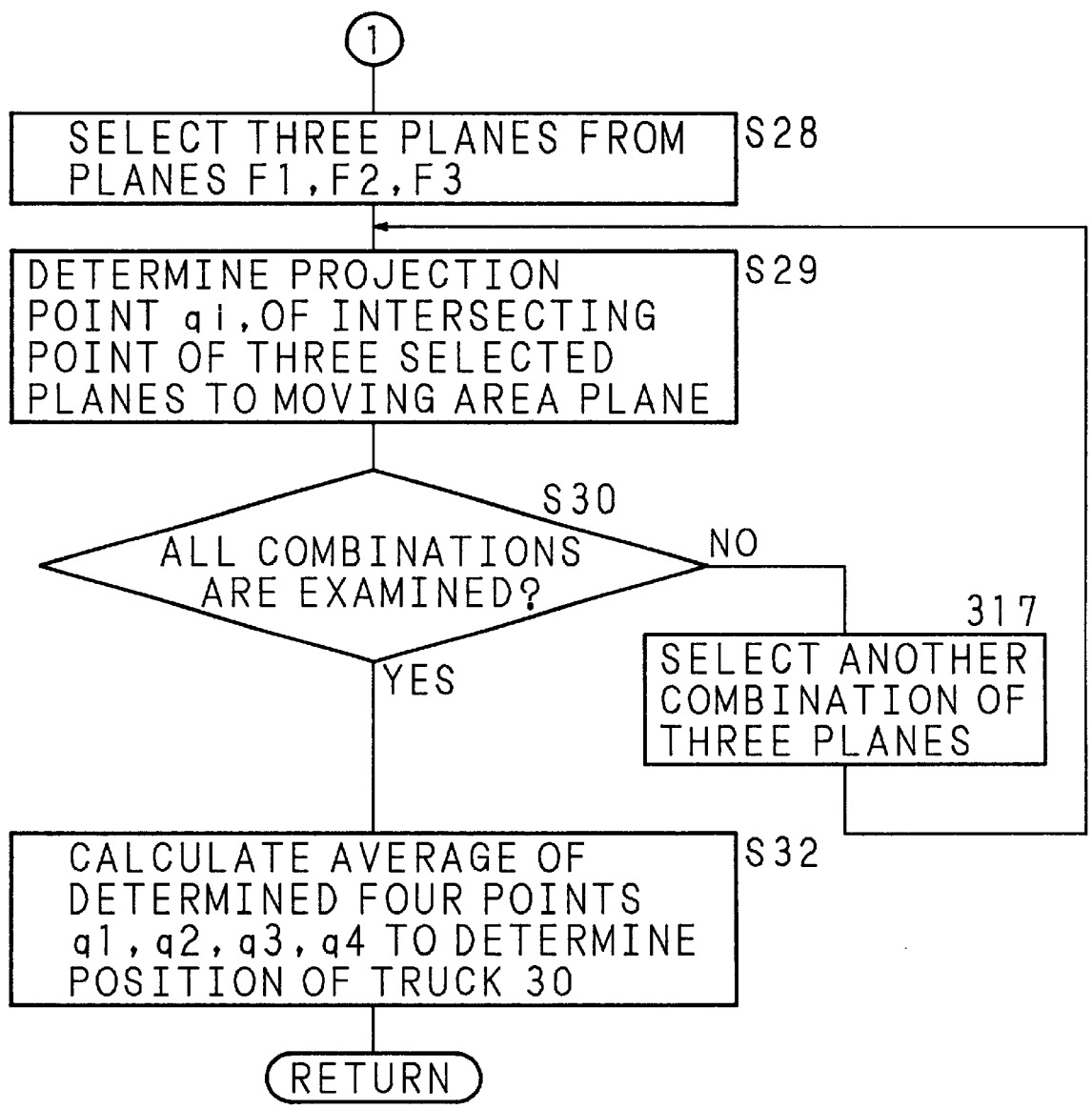
FIG. 16 is a flowchart showing a processing procedure in the position calculating process.

FIGS. 15 and 16 are flowcharts for explaining a processing procedure in the position calculating process. Starting with i being 1 (step S21), two points pi and pj included in one side of the square determined in the comparison process are selected from the four corner points p1, p2, p3, p4 of the square (step S22). Assuming that the moving area is divided into two parts by the line connecting the selected two points pi and pj, one point pk located on the other side of the square relative to the line is selected (step S23).

Mutual correlation values R(pi), R(pj), R(pk) at the selected three points pi, pj, pk are calculated (step S24). Three points pi', pj' pk' corresponding to the above-mentioned three points pi, pj, pk are determined in a three-dimensional space formed by a plane (x, y) constituting the moving area and the coordinate axis perpendicular to the plane (x, y) which represents the mutual correlation value R(x, y). A plane Fi containing the three points pi', pj', pk' is then determined (step S25). Whether the plane Fi has been determined or not for each of the four sides of the square is examined(step S26). If not, the number i is incremented (step S27), and the procedure returns to the step S22.

If all of the four planes F1, F2, F3, F4 are already determined, three planes are selected from these four planes (step S28). A point qi is determined as a projection of an intersecting point of the three planes onto the plane (x, y) constituting the moving area (step S29). Whether this process has been carried out or not for all the combinations of selected three planes is examined (step S30). If not, another combination of three planes is selected (step S31), and the procedure goes to the step S29.

If it is found in the step S30 that all the combinations are finished, an average value of the four points q1, q2, q3, q4 obtained in the above process is calculated to determine the position of the truck 30 (step S32).

According to the above construction, the mutual correlation value R(i) between the reference data Drb(i) showing the reference received light pattern and the comparison data Drc showing the obtained received light pattern is calculated, and the position of the truck 30 is determined based on this calculation. This eliminates the need for identifying the reflector Ili.

Also, since the comparison data Drc are determined from the received light data Dr by utilizing the angle data θ of the moving direction d1 detected by the gyrosensor 40, relative to the reference direction dO the reference data Drb(i) at each point i in the moving area need only to be those when turning to the reference direction d0. This reduces the amount of the reference data Drb(i) to be stored and also reduces the number of comparisons to be carried out.

Alternatively, instead of using the gyrosensor 40, reference data when turning to a plurality of directions may be stored in the memory 22 for each point i in the moving area, and the moving direction may be determined by pattern matching.

In addition, since the moving area is meshed into a lattice at the same interval and the reference data Drb(i) are set at each of the intersecting points i, the distribution of the points i is uniform, whereby the position of the truck 30 can he determined with uniform precision.

Instead of squares, the moving area may be meshed into polygons of the same shape.

Further, since the pattern matching is carried out using the mutual correlation value as a similarity and the position detecting is complemented by using this value, a highly precise detecting of the position can he achieved.

Here, a polygon containing the position of the movable body may only he determined by pattern matching from the meshed moving area without complementing the position detecting.

The similarity may be determined by a normalized correlation or by Fourier transform of a luminance curve.

Also, it is highly probable that the truck 30 will move in the previously detected direction, so that the range in which the moving direction changes within a short detecting period is limited. Therefore, the position of the truck 30 is guessed by an ellipse using the previously detected position of the truck 30 and the previously detected moving direction to select the points in the ellipse as comparison target points. This provides an accurate guess of the position of the truck 30 and also the number of comparisons can he reduced.

The range or selection for the comparison target points may be a fan-shaped region with its center located at the previously detected position of the truck 30, its radius being the maximum distance that the truck 30 can travel within the control period, and its central angle being a predetermined angle having the previously detected direction in the middle of the angle.

Also, since the irradiating mirror M2 is used which can irradiate and condense the light simultaneously in all the directions around the truck 30, no time difference occurs such as in detecting the plurality of reflectors, whereby the position of the truck 30 can be determined with a high precision.

Alternatively, by using a tilted plane mirror and a rotation mechanism, the light may he irradiated and condensed in all the directions around the truck 30 by irradiating and condensing the light in one direction among the circumferential directions of the truck 30 by means of the plane mirror and rotating the plane mirror by means of the rotation mechanism.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of detecting a position of a movable body comprising the steps of:

emitting light to outside of said movable body by means of a light emitting apparatus provided with said movable body;

receiving said light, which is reflected by a plurality of reflectors provided with a moving area of said movable body, by means of a light receiving apparatus provided with said movable body for obtaining an electric output corresponding to an intensity of said received light;

comparing a received-light luminance distribution along a circumferential direction of said movable body, which is obtained from the received-light output, with reference received-light luminance distributions stored in advance in association with a plurality of positions in said moving area of said movable body; and detecting the position of said movable body in accordance with a comparison result.

2. A method according to claim 1, wherein said reference received-light luminance distributions are given in a state in which said movable body turns towards a predetermined reference direction, said method further comprising the steps of:

detecting an angle of a moving direction of said movable body relative to said reference direction by an angle detecting means provided with said movable body;

correcting the received-light luminance distribution obtained by said light receiving apparatus into the received-light luminance distribution when the movable body turns said reference direction, by utilizing the detected angle; and comparing the corrected received-light luminance distribution with said reference received-light luminance distributions.

3. A method according to claim 1, wherein the plurality of positions in the moving area provided with association with said reference received-light luminance distributions are respective apexes of meshes formed by polygons of the same shape that divide the moving area.

4. A method according to claim 2, wherein the plurality of positions in the moving area provided with association with said reference received-light luminance distributions are respective apexes of meshes formed by polygons of the same shape that divide the moving area.

5. A method according to claim 3, further comprising the steps of:
   determining a similarity between said received-light luminance distribution and each of said reference received-light luminance distributions by said comparison;
   selecting an apex having the highest similarity from the apexes of said meshes in the moving area;
   selecting a plurality of polygons having said selected apex as one of apexes thereof;
   selecting a polygon having the largest sum of similarities associated with the apexes of the polygon, from said selected polygons;
   determining, for each side of said selected polygon, three points in a three-dimensional space having a coordinate axis which is perpendicular to a plane of moving of said movable body and which represents said similarity, corresponding to three points which are located on the plane of moving and which include two apexes at two ends of said side of said selected polygon and one apex of the mesh located opposite to said selected polygon relative to said side of said selected polygon;
   determining a plane that passes through said three points in said three-dimensional space for said side of said selected polygon;
   determining an intersecting point of each combination of three planes selected from the planes determined for all the sides constituting said selected polygon; and
   determining the position of the movable body as an average of all the determined intersecting points.

6. A method according to claim 4, further comprising the steps of:
   determining a similarity between said received-light luminance distribution and each of said reference received-light luminance distributions by said comparison;
   selecting an apex having the highest similarity from the apexes of said meshes in the moving area;
   selecting a plurality of polygons having said selected apex as one of apexes thereof;
   selecting a polygon having the largest sum of similarities associated with the apexes of the polygon, from said selected polygons;
   determining, for each side of said selected polygon, three points in a three-dimensional space having a coordinate axis which is perpendicular to a plane of moving of said movable body and which represents said similarity, corresponding to three points which are located on the plane of moving and which include two apexes at two ends of said side of said selected polygon and one apex of the mesh located opposite to said selected polygon relative to said side of said selected polygon;
   determining a plane that passes through said three points in said three-dimensional space for said side of said selected polygon;
   determining an intersecting point of each combination of three planes selected from the planes determined for all the sides constituting said selected polygon; and
   determining the position of the movable body as an average of all the determined intersecting points.

7. A method according to claim 1, wherein the positions associated with said reference received-light luminance distributions are selected as comparison targets in accordance with the detected position and moving direction of said movable body.

8. A method according to claim 2, wherein the positions associated with said reference received-light luminance distributions are selected as comparison targets in accordance with the detected position and moving direction of said movable body.

9. A method according to claim 3, wherein the positions associated with said reference received-light luminance distributions are selected as comparison targets in accordance with the detected position and moving direction of said movable body.

10. A method according to claim 4, wherein the positions associated with said reference received-light luminance distributions are selected as comparison targets in accordance with the detected position and moving direction of said movable body.

11. A method according to claim 5, wherein the positions associated with said reference received-light luminance distributions are selected as comparison targets in accordance with the detected position and moving direction of said movable body.

12. A method according to claim 6, wherein the positions associated with said reference received-light luminance distributions are selected as comparison targets in accordance with the detected position and moving direction of said movable body.

13. A method according to claim 7, wherein said positions associated with said reference received-light luminance distributions and selected as comparison targets are positions contained within an ellipse with its major axis being a line segment connecting the detected position of said movable body with a point located at the maximum distance that said movable body can travel within a predetermined period of time in the moving direction.

14. A method according to claim 8, wherein said positions associated with said reference received-light luminance distributions and selected as comparison targets are positions contained within an ellipse with its major axis being a line segment connecting the detected position of said movable body with a point located at the maximum distance that said movable body can travel within a predetermined period of time in the moving direction.

15. A method according to claim 9, wherein said positions associated with said reference received-light luminance distributions and selected as comparison targets are positions contained within an ellipse with its major axis being a line segment connecting the detected position of said movable body with a point located at the maximum distance that said movable body can travel within a predetermined period of time in the moving direction.

16. A method according to claim 10, wherein said positions associated with said reference received-light luminance distributions and selected as comparison targets are positions contained within an ellipse with its major axis being a line segment connecting the detected position of said movable body with a point located at the maximum distance that said movable body can travel within a predetermined period of time in the moving direction.

17. A method according to claim 11, wherein said positions associated with said reference received-light luminance distributions and selected as comparison targets are positions contained within an ellipse with its major axis being a line segment connecting the detected position of said movable body with a point located at the maximum distance that said movable body can travel within a predetermined period of time in the moving direction.

18. A method according to claim 12, wherein said positions associated with said reference received-light luminance distributions and selected as comparison targets are positions contained within an ellipse with its major axis being a line segment connecting the detected position of said movable body with a point located at the maximum distance that said movable body can travel within a predetermined period of time in the moving direction.

19. A method according to claim 7, wherein said positions associated with said reference received-light luminance distributions and selected as comparison targets are positions contained within a fan-shaped region with its center located at the detected position of said movable body, its radius being the maximum distance that said movable body can travel within a predetermined period of time, and its central angle being a predetermined angle having the detected direction of said movable body in the middle of the angle.

20. A method according to claim 8, wherein said positions associated with said reference received-light luminance distributions and selected as comparison targets are positions contained within a fan-shaped region with its center located at the detected position of said movable body, its radius being the maximum distance that said movable body can travel within a predetermined period of time, and its central angle being a predetermined angle having the detected direction of said movable body in the middle of the angle.

21. A method according to claim 9, wherein said positions associated with said reference received-light luminance distributions and selected as comparison targets are positions contained within a fan-shaped region with its center located at the detected position of said movable body, its radius being the maximum distance that said movable body can travel within a predetermined period of time, and its central angle being a predetermined angle having the detected direction of said movable body in the middle of the angle.

22. A method according to claim 10, wherein said positions associated with said reference received-light luminance distributions and selected as comparison targets are positions contained within a fan-shaped region with its center located at the detected position of said movable body, its radius being the maximum distance that said movable body can travel within a predetermined period of time, and its central angle being a predetermined angle having the detected direction of said movable body in the middle of the angle.

23. A method according to claim 11, wherein said positions associated with said reference received-light luminance distributions and selected as comparison targets are positions contained within a fan-shaped region with its center located at the detected position of said movable body, its radius being the maximum distance that said movable body can travel within a predetermined period of time, and its central angle being a predetermined angle having the detected direction of said movable body in the middle of the angle.

24. A method according to claim 12, wherein said positions associated with said reference received-light luminance distributions and selected as comparison targets are positions contained within a fan-shaped region with its center located at the detected position of said movable body, its radius being the maximum distance that said movable body can travel within a predetermined period of time, and its central angle being a predetermined angle having the detected direction of said movable body in the middle of the angle.

25. An apparatus for detecting a position of a movable body comprising:

a light emitting apparatus provided with said movable body;

a light receiving apparatus provided with said movable body for obtaining an electric output corresponding to an intensity of received light;

a storage medium; and a controller for calculating a position of said movable body in accordance with the output obtained by receiving, by means of said light receiving apparatus, the light emitted from said light emitting apparatus and reflected by a plurality of reflectors disposed at appropriate positions in a moving area of said movable body, wherein said controller is coupled to said storage medium and capable of performing the operations of:

reading, from said storage medium, reference received-light luminance distributions at a plurality of positions in said moving area of said movable body; and comparing a received-light luminance distribution obtained by said light receiving apparatus, with said reference received-light luminance distributions to calculate the position of said movable body.

26. An apparatus according to claim 25, wherein said light emitting apparatus comprises a light source unit and an irradiating unit for reflecting and rotating the light emitted by said light source unit to irradiate the light in all directions around the movable body.

27. An apparatus according to claim 25, wherein said light emitting apparatus comprises a light source unit and an irradiating unit for simultaneously irradiating the light emitted by said light source unit in all directions around the movable body.

28. An apparatus according to claim 25, wherein said light receiving apparatus comprises a reflector for reflecting the light from around the movable body, a condensing unit for rotating said reflector to condense the light from all directions around the movable body into an annular light, and a light receiving unit for receiving the light condensed by said condensing unit.

29. An apparatus according to claim 26, wherein said light receiving apparatus comprises a reflector for reflecting the light from around the movable body, a condensing unit for rotating said reflector to condense the light from all directions around the movable body into an annular light, and a light receiving unit for receiving the light condensed by said condensing unit.

30. An apparatus according to claim 27, wherein said light receiving apparatus comprises a reflector for reflecting the light from around the movable body, a condensing unit for rotating said reflector to condense the light from all directions around the movable body into an annular light, and a light receiving unit for receiving the light condensed by said condensing unit.

31. An apparatus according to claim 25, wherein said light receiving apparatus comprises a condensing unit for condensing the light from all directions around the movable body simultaneously into an annular light, and a light receiving unit for receiving the light condensed by said condensing unit.

32. An apparatus according to claim 26, wherein said light receiving apparatus comprises a condensing unit for con densing the light from all directions around the movable body simultaneously into an annular light, and a light receiving unit for receiving the light condensed by said condensing unit.

33. An apparatus according to claim 27, wherein said light receiving apparatus comprises a condensing unit for condensing the light from all directions around the movable body simultaneously into an annular light, and a light receiving unit for receiving the light condensed by said condensing unit.

* * * * *